(12) United States Patent
Ihara

(10) Patent No.: US 10,558,196 B2
(45) Date of Patent: *Feb. 11, 2020

(54) THREE-DIMENSIONAL OBJECT DIVISION OUTPUT APPARATUS AND ITS APPLICATION

(71) Applicant: FUJIFILM CORPORATION, Tokyo (JP)

(72) Inventor: Satoshi Ihara, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 433 days.

This patent is subject to a terminal disclaimer.

(21) Appl. No.: 14/848,600

(22) Filed: Sep. 9, 2015

(65) Prior Publication Data

US 2016/0075088 A1 Mar. 17, 2016

(30) Foreign Application Priority Data

Sep. 12, 2014 (JP) ................................ 2014-186300

(51) Int. Cl.
*G06K 9/46* (2006.01)
*B29C 67/00* (2017.01)
*G05B 19/4099* (2006.01)
*B33Y 50/02* (2015.01)

(52) U.S. Cl.
CPC .......... *G05B 19/4099* (2013.01); *B33Y 50/02* (2014.12); *G05B 2219/35134* (2013.01); *G05B 2219/49007* (2013.01)

(58) Field of Classification Search
CPC ... B29C 67/0088; B29C 64/386; G09B 23/30; G05B 19/4099; G05B 19/4097; G05B 2219/35134; G05B 2219/49007; Y02P 90/265; B33Y 50/02; G06F 17/50; G06T 19/00; A61C 13/0004
See application file for complete search history.

(56) References Cited

U.S. PATENT DOCUMENTS

2009/0024152 A1* 1/2009 Boyden .................... A61F 2/06
606/155
2011/0190626 A1 8/2011 Mizuno
2012/0275682 A1 11/2012 Ihara
(Continued)

FOREIGN PATENT DOCUMENTS

JP 2003-241647 A 8/2003
JP 2010-220742 A 10/2010
(Continued)

*Primary Examiner* — Sultana Begum
(74) *Attorney, Agent, or Firm* — Sughrue Mion, PLLC

(57) ABSTRACT

A division position search unit searches for a division position on an edge present on a path from a second end point, which is one of plural end points of a tree structure of a three-dimensional object other than a first end point, toward the first end point, and at the division position, the size of a downstream tree structure spreading from the division position toward a direction opposite to the first end point changing from a size within an output range of a three-dimensional object creation apparatus to a size exceeding the output range. Then, a division unit divides, at the division position, the three-dimensional object into a division object the size of which is within the output range and a remaining object. An output unit outputs the division object to the three-dimensional object creation apparatus.

13 Claims, 10 Drawing Sheets

(56) References Cited

U.S. PATENT DOCUMENTS

| | | | |
|---|---|---|---|
| 2015/0029184 A1 | 1/2015 | Masumoto | |
| 2015/0268058 A1* | 9/2015 | Samarasekera | G06K 9/00637 |
| | | | 701/409 |
| 2016/0046074 A1* | 2/2016 | Jang | B29C 67/0088 |
| | | | 700/119 |
| 2016/0077504 A1* | 3/2016 | Sagawa | B33Y 50/02 |
| | | | 700/98 |
| 2016/0148541 A1* | 5/2016 | Ristolainen | G09B 23/285 |
| | | | 434/268 |
| 2018/0001184 A1* | 1/2018 | Tran | H04N 5/2257 |

FOREIGN PATENT DOCUMENTS

| | | |
|---|---|---|
| JP | 2011-212312 A | 10/2011 |
| JP | 2012-200403 A | 10/2012 |
| JP | 2012-228396 A | 11/2012 |
| JP | 2013-222361 A | 10/2013 |

* cited by examiner

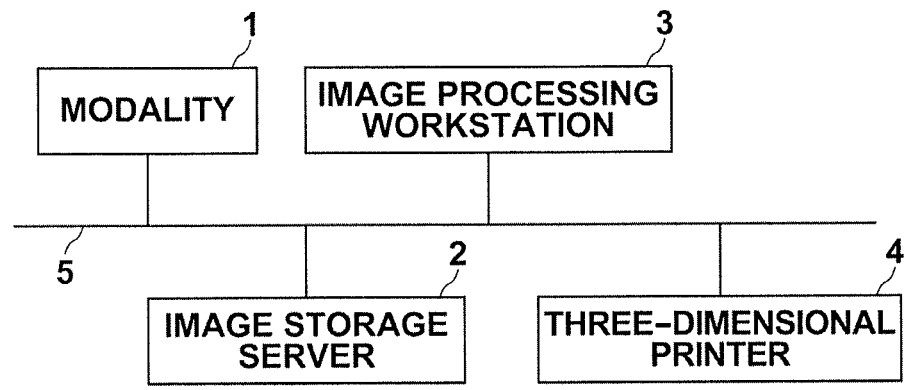
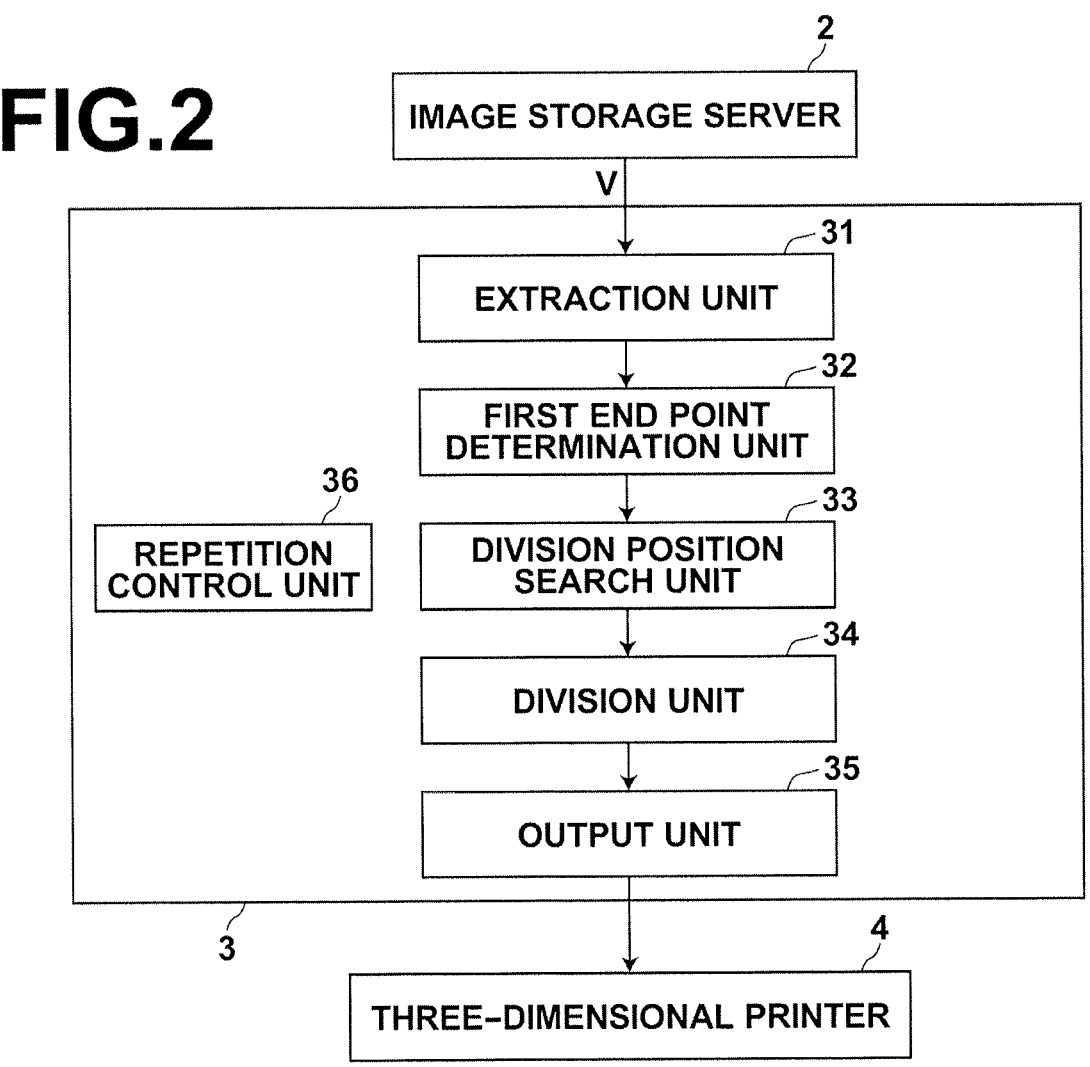

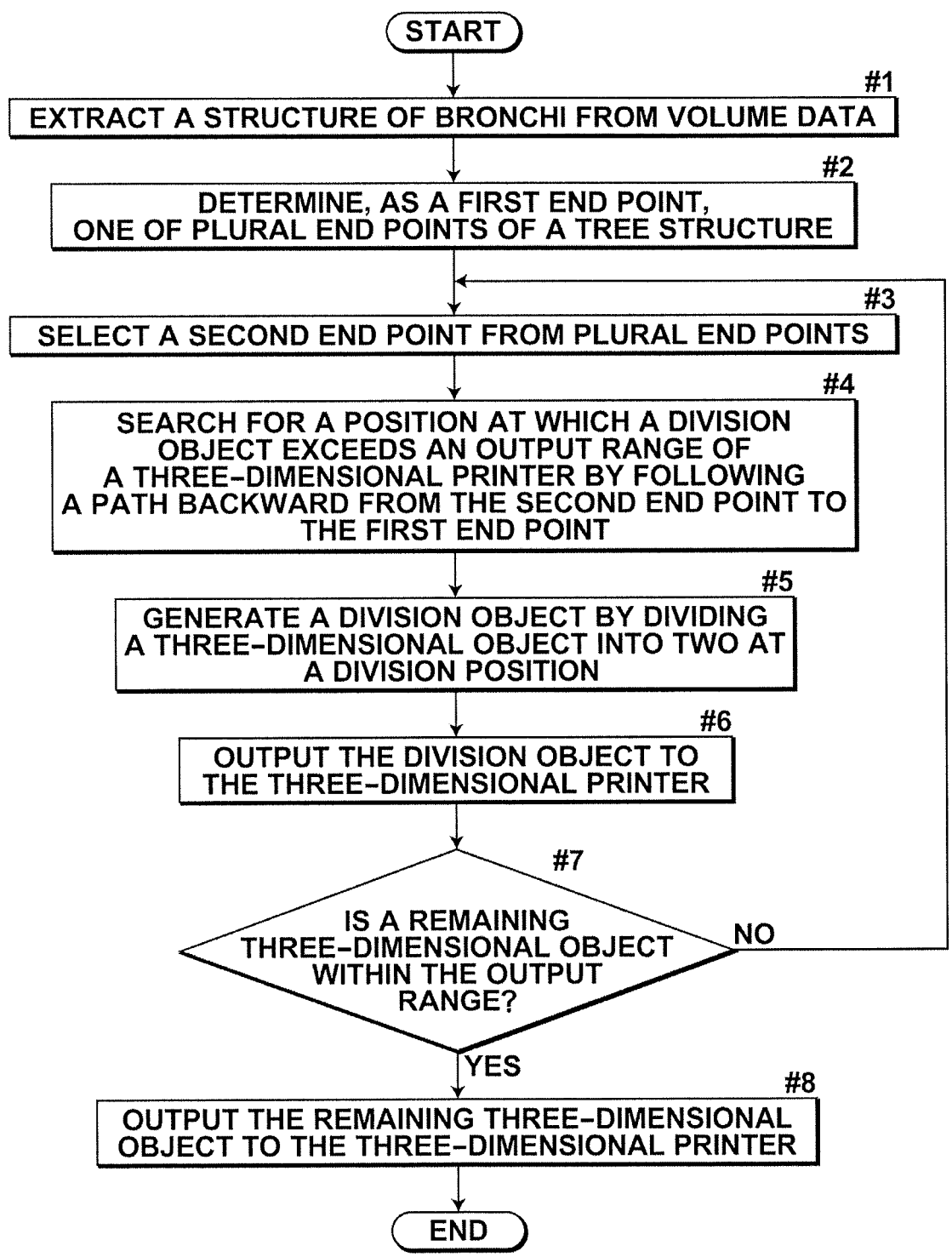

THREE-DIMENSIONAL OBJECT DIVISION OUTPUT APPARATUS AND ITS APPLICATION

CROSS-REFERENCE TO RELATED APPLICATIONS

The present application claims priority under 35 U.S.C. § 119 to Japanese Patent Application No. 2014-186300 filed on Sep. 12, 2014. The above application is hereby expressly incorporated by reference, in its entirety, into the present application.

BACKGROUND

The present disclosure relates to a three-dimensional object division output apparatus that outputs an object having a tree structure by dividing the object into parts that do not exceed an output range of a three-dimensional object creation apparatus when the object is output to the three-dimensional object creation apparatus and its application.

Attempts were made in recent years to produce a three-dimensional model of blood vessels or an organ of a patient for assisting doctors or the like in diagnosis, consideration of a surgery method or the like. Such a three-dimensional model is produced based on tomograms of the patient obtained by a CT (Computed Tomography) apparatus, an MRI (Magnetic Resonance Imaging) apparatus and the like.

For example, Japanese Unexamined Patent Publication No. 2003-241647 (Patent Document 1) discloses a method in which data of a target region are extracted from tomographic data of a patient obtained by imaging the patient by a CT apparatus, an MRI apparatus or the like. Further, cross-sectional data for creating a model are generated from the extracted tomographic data, and a precision powder model is produced by depositing powder material by using the generated cross-sectional data. Further, blood vessels or an organ for each patient is produced with transparent or semi-transparent flexible polymer, such as silicon, by using the produced precision powder model, as a mold.

Further, Japanese Unexamined Patent Publication No. 2013-222361 (Patent Document 2) discloses a method in which structures, such as a liver region, hepatic arteries and hepatic veins, are extracted from three-dimensional volume data, and surface data of these structures are generated. After three-dimensional model data are generated by combining the surface data of the structures, a three-dimensional model is produced by a three-dimensional printer by using slice data obtained by dividing the three-dimensional model at contour surfaces.

SUMMARY

When a large object having a high resolution is output from an object creation apparatus, such as a three-dimensional printer, a large-scale three-dimensional printer corresponding to the size of the object is needed. However, such a large-scale three-dimensional printer is extremely expensive. Therefore, in actual cases, an object is divided into small objects, and each of the small objects is output from a small-scale three-dimensional printer, and the whole large object is produced by joining the small objects together after then.

When an object is divided and output, if the object has a shape, such as a block or a ball, how the object is divided is not a significant issue. However, when the object has a tree structure, such as blood vessels and bronchi, if the object is simply divided into parts corresponding to the shape of a rectangular parallelepiped representing the outputtable range of the three-dimensional printer, end portions of edges of the tree structure are separated into small portions of edges. Therefore, when parts are assembled together later, the number of positions at which the parts are joined together increases. Hence, the method would not be regarded as a realistic division method.

For example, when bronchi, which have a tree structure, are output from a three-dimensional printer, it is desirable to divide the bronchi at a position traversing an interlobar surface to reduce the number of times of joining parts together, and to output a larger object. However, even if the object is divided at the interlobar surface, the size of a divided part exceeds the output range of a three-dimensional printer in some cases.

As described, when an object having a tree structure, such as blood vessels and bronchi, is output from a small-scale three-dimensional printer, it is important to adopt a division method in which an object is divided in such a manner that a small piece is not output from the three-dimensional printer.

In view of the foregoing circumstances, the present disclosure provides a three-dimensional object division output apparatus that outputs a three-dimensional object to a three-dimensional object creation apparatus by dividing the three-dimensional object into parts in such a manner that a small piece is not output when the three-dimensional object is output from the three-dimensional object creation apparatus and its application.

A three-dimensional object division output apparatus of the present disclosure includes an extraction unit that extracts, from volume data, a three-dimensional object having a tree structure including plural end points, plural branch points, at least one edge each connecting one of the plural end points and one of the plural branch points to each other, and at least one edge each connecting two of the plural branch points to each other, a first end point determination unit that determines one of the plural end points, as a first end point, a division position search unit that searches for a division position on an edge present on a path from a second end point, which is one of the plurality of end points other than the first end point, toward the first end point, and at the division position, the size of a downstream tree structure spreading from the division position toward a direction opposite to the first end point changing from a size within an output range of a three-dimensional object creation apparatus to a size exceeding the output range, a division unit that divides, at the division position obtained by search, the three-dimensional object into a division object the size of which is within the output range and a remaining object, and an output unit that outputs the division object to the three-dimensional object creation apparatus.

An operation method of a three-dimensional object division output apparatus of the present disclosure is an operation method of the three-dimensional object division output apparatus including an extraction unit, a first end point determination unit, a division position search unit, a division unit and an output unit. The method includes an extraction step in which the extraction unit extracts, from volume data, a three-dimensional object having a tree structure including plural end points, plural branch points, at least one edge each connecting one of the plural end points and one of the plural branch points to each other, and at least one edge each connecting two of the plural branch points to each other, a first end point determination step in which the first end point determination unit determines one of the plural end points, as a first end point, a division position search step in which the division position search unit that searches for a division position on an edge present on a path from a second end point, which is one of the plurality of end points other than the first end point, toward the first end point, and at the division position, the size of a downstream tree structure spreading from the division position toward a direction opposite to the first end point changing from a size within an output range of a three-dimensional object creation apparatus to a size exceeding the output range, a division step in which the division unit divides, at the division position obtained by search, the three-dimensional object into a division object the size of which is within the output range and a remaining object, and an output step in which the output unit outputs the division object to the three-dimensional object creation apparatus.

A three-dimensional object division output program of the present disclosure causes a computer to execute an extraction step that extracts, from volume data, a three-dimensional object having a tree structure including plural end points, plural branch points, at least one edge each connecting one of the plural end points and one of the plural branch points to each other, and at least one edge each connecting two of the plural branch points to each other, a first end point determination step that determines one of the plural end points, as a first end point, a division position search step that searches for a division position on an edge present on a path from a second end point, which is one of the plurality of end points other than the first end point, toward the first end point, and at the division position, the size of a downstream tree structure spreading from the division position toward a direction opposite to the first end point changing from a size within an output range of a three-dimensional object creation apparatus to a size exceeding the output range, a division step that divides, at the division position obtained by search, the three-dimensional object into a division object the size of which is within the output range and a remaining object, and an output step that outputs the division object to the three-dimensional object creation apparatus.

The "tree structure" includes plural end points, plural branch points, at least one edge each connecting an end point and a branch point to each other, and at least one edge each connecting two branch points to each other, and has a hierarchical structure in which edges branch at branch points. Specifically, the "three-dimensional object having a tree structure" is bronchi, blood vessels and the like.

The "output range of a three-dimensional object creation apparatus" is represented by the maximum height, width and depth of an object that the three-dimensional object creation apparatus can output. Further, the expression "the size of a division object exceeds the output range of a three-dimensional object creation apparatus" means that at least one of the height, the width and the depth of the division object exceeds the size of the maximum output range of the three-dimensional object creation apparatus.

When the division position search unit performs search from the second end point toward the first end point on the path, the division position search unit may search, in order of reaching each branch point, for a branch point at which the size of a downstream tree structure spreading therefrom toward a direction opposite to the first end point changes from a size within the output range to a size exceeding the output range, and search an edge immediately before the branch point, obtained by search, for the division position at which the size of the division object becomes a size within the output range.

The division position search unit may search each edge on a path from the second end point to the first end point for an edge connecting two branch points to each other, and the size of a downstream tree structure spreading from one of the two branch points toward a direction opposite to the first end point being within the output range while the size of a downstream tree structure spreading from the other one of the two branch points toward a direction opposite to the first end point exceeds the output range, and search the edge for the division position at which the size of the division object becomes a size within the output range.

It is desirable that the three-dimensional object division output apparatus further includes a repetition control unit that repeatedly generates, with respect to the three-dimensional object excluding the division object, a new division object by using the division position search unit and the division unit.

It is desirable that the division position search unit selects, as the second end point, an end point having a longest total length of edges on a path to the first end point therefrom from end points included in the three-dimensional object or the three-dimensional object excluding the division object other than the first end point.

The first end point may be a specific end point.

The "specific end point" may be, for example, an end point constituting a root of a tree structure.

Another three-dimensional object division output apparatus of the present disclosure includes an extraction unit that extracts, from volume data, a three-dimensional object having a tree structure including plural end points, plural branch points, at least one edge each connecting one of the plural end points and one of the plural branch points to each other, and at least one edge each connecting two of the plural branch points to each other, a third end point selection unit that selects one of the plural end points, as a third end point, a selected region determination unit that determines a selected region by advancing on a path from the third end point toward another end point of the tree structure while selecting, at each branch point reached from the third end point, an edge having a largest number of edges continuing forward therefrom from edges to which the branch point branches, and by repeating processing of including, in the selected region, a downstream tree structure spreading from each of the branch points toward a direction opposite to a direction in which processing advances on the path, a division position search unit that searches each branch point on the path for a branch point at which the size of the tree structure included in the selected region becomes a size exceeding the output range of the three-dimensional object creation apparatus from a size within the output range, and searches an edge immediately before the branch point, obtained by search, for the division position at which the size of the division object becomes a size within the output range, a division unit that divides, at the division position, the three-dimensional object into a division object the size of which is within the output range and a remaining object, and an output unit that outputs the division object to the three-dimensional object creation apparatus.

An operation method of another three-dimensional object division output apparatus of the present disclosure is an operation method of the three-dimensional object division output apparatus including an extraction unit, a third end point selection unit, a selected region determination unit, a division position search unit, a division unit and an output unit. The method includes an extraction step in which the extraction unit extracts, from volume data, a three-dimensional object having a tree structure including plural end points, plural branch points, at least one edge each connecting one of the plural end points and one of the plural branch points to each other, and at least one edge each connecting two of the plural branch points to each other, a third end point selection step in which the third end point selection unit selects one of the plural end points, as a third end point, a selected region determination step in which the selected region determination unit determines a selected region by advancing on a path from the third end point toward another end point of the tree structure while selecting, at each branch point reached from the third end point, an edge having a largest number of edges continuing forward therefrom from edges to which the branch point branches, and by repeating processing of including, in the selected region, a downstream tree structure spreading from each of the branch points toward a direction opposite to a direction in which processing advances on the path, a division position search step in which the division position search unit searches each branch point on the path for a branch point at which the size of the tree structure included in the selected region becomes a size exceeding the output range of the three-dimensional object creation apparatus from a size within the output range, and searches an edge immediately before the branch point, obtained by search, for the division position at which the size of the division object becomes a size within the output range, a division step in which the division unit divides, at the division position, the three-dimensional object into a division object the size of which is within the output range and a remaining object, and an output step in which the output unit outputs the division object to the three-dimensional object creation apparatus.

Another three-dimensional object division output program of the present disclosure causes a computer to execute an extraction step that extracts, from volume data, a three-dimensional object having a tree structure including plural end points, plural branch points, at least one edge each connecting one of the plural end points and one of the plural branch points to each other, and at least one edge each connecting two of the plural branch points to each other, a third end point selection step that selects one of the plural end points, as a third end point, a selected region determination step that determines a selected region by advancing on a path from the third end point toward another end point of the tree structure while selecting, at each branch point reached from the third end point, an edge having a largest number of edges continuing forward therefrom from edges to which the branch point branches, and by repeating processing of including, in the selected region, a downstream tree structure spreading from each of the branch points toward a direction opposite to a direction in which processing advances on the path, a division position search step that searches each branch point on the path for a branch point at which the size of the tree structure included in the selected region becomes a size exceeding the output range of the three-dimensional object creation apparatus from a size within the output range, and searches an edge immediately before the branch point, obtained by search, for the division position at which the size of the division object becomes a size within the output range, a division step that divides, at the division position, the three-dimensional object into a division object the size of which is within the output range and a remaining object, and an output step that outputs the division object to the three-dimensional object creation apparatus.

It is desirable that three-dimensional object division output apparatus further includes a repetition control unit that repeatedly generates, with respect to the three-dimensional object excluding the division object, a new division object by using the third end point selection unit, the selected region determination unit, the division position search unit and the division unit.

It is desirable that the division position search unit searches for a division position at which the size of the division object becomes a size within the output range, and also if the diameter of a cut surface of the three-dimensional object divided at the division position is less than a predetermined value, a division position at which the diameter of a cut surface is greater than the predetermined value on the same edge.

According to the present disclosure, a path is followed from one of plural end points of a tree structure of a three-dimensional object toward another end point of the tree structure, and a branch point at which the size of a division object changes from a size within an output range of a three-dimensional object creation apparatus to a size exceeding the output range is searched for. Further, a division object is generated by dividing the three-dimensional object at a point on an edge immediately before the branch point obtained by search, and output to the three-dimensional object creation apparatus. Accordingly, it is possible to divide the three-dimensional object in such a manner that a small piece is not output, and to output the three-dimensional object to a three-dimensional printer by minimizing the number of times of output. Further, it is possible to reduce the number of positions at which parts are joined together when the divided parts of the three-dimensional object are assembled together.

Note that the program of the present disclosure may be provided being recorded on a computer readable medium. Those who are skilled in the art would know that computer readable media are not limited to any specific type of device, and include, but are not limited to: floppy disks, CD's, RAM's, ROM's, hard disks, and magnetic tapes. Such computer-readable storage media store data and/or instructions that cause a machine to perform the functions in the present disclosure.

BRIEF DESCRIPTION OF THE DRAWINGS

FIG. 1 is a schematic diagram illustrating the configuration of a three-dimensional model production system to which a three-dimensional object division output apparatus according to an embodiment of the present disclosure has been applied;

FIG. 2 is a functional block diagram of a three-dimensional object division output unit according to a first embodiment of the present disclosure;

FIG. 3 is a flow chart showing a flow of processing of a three-dimensional model production system according to the first embodiment of the present disclosure;

DESCRIPTION OF THE PREFERRED EMBODIMENTS

Figure 4:
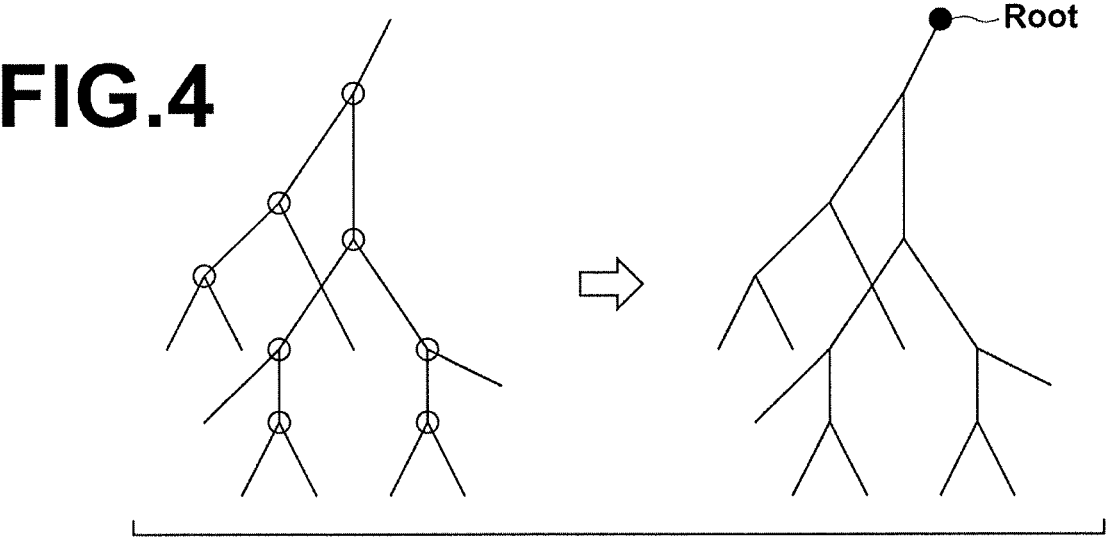
FIG. 4 is a diagram illustrating an example of a tree structure.

Embodiments of a three-dimensional object division output apparatus of the present disclosure will be described with reference to drawings. FIG. 1 is a schematic diagram illustrating the hardware configuration of a three-dimensional model production system in which a three-dimensional object division output apparatus is provided. As illustrated in FIG. 1, this system includes a modality 1, an image storage server 2, an image processing workstation 3, and a three-dimensional object creation apparatus 4, which are connected to each other through a network 5 in such a manner that they can communicate with each other.

The modality 1 may include an apparatus that generates image data of a three-dimensional medical image representing a target region of a patient by imaging the target region, and outputs the image data, as image information, by attaching supplementary information defined by the DICOM (Digital Imaging and Communications in Medicine) standard to the image data. Specific examples are image data obtained by imaging by a CT, MRI or the like. In the following descriptions, image data of a three-dimensional medical image will be used, as volume data.

The image storage server 2 is a computer that stores, in an image database, volume data obtained at the modality 1 or image data generated by image processing at the image processing workstation 3, and manages the data. The image storage server 2 includes a large capacity external storage apparatus and software for managing database (for example, ORDB (Object Relational Database) management software).

The image processing workstation 3 is a computer that performs, based on a request by a user, image processing on volume data obtained from the modality 1 or the image storage server 2. The image processing workstation 3 includes known hardware configuration, such as a CPU (Central Processing Unit), a main memory, an auxiliary storage unit, an input output interface, a communication interface, an input device (a mouse, keyboard and the like), a display device (a display monitor) and a data bus. Further, a known operating system or the like has been installed in the image processing workstation 3. The three-dimensional object division output apparatus of the present disclosure has been installed in this image processing workstation 3. The processing of the three-dimensional object division output apparatus is performed by executing a program installed from a recording medium, such as a CD-ROM (Compact Disc Read Only Memory). Alternatively, the program may be installed after being downloaded from a storage apparatus of a server connected through a network, such as the Internet.

The three-dimensional object creation apparatus 4 generates data of contour surfaces (cross-sectional data or the like) of a three-dimensional object to be output, and produces a three-dimensional object by depositing, based on the cross-sectional data, cross-sectional shapes one on another. As a method for producing a three-dimensional object, there are an inkjet method, in which liquid resin is gradually cured by outputting ultraviolet rays or the like to the resin, an FDM (Fused Deposition Modeling) method, in which thermally fused resin is successively deposited little by little, a binding jetting method, in which an adhesive is jetted onto powder resin, and the like. Hereafter, the three-dimensional object creation apparatus will be referred to as a three-dimensional printer.

FIG. 2 is a block diagram illustrating a three-dimensional object division output unit (a three-dimensional object division output apparatus) according to a first embodiment of the present disclosure, which is one of functions of the image processing workstation 3. FIG. 3 is a flow chart showing a flow of processing. As illustrated in FIG. 2, the three-dimensional object division output unit in an embodiment of the present disclosure is achieved by an extraction unit 31, a first end point determination unit 32, a division position search unit 33, a division unit 34, an output unit 35 and a repetition control unit 36.

Next, the three-dimensional object division output unit according to a second embodiment will be described in detail with reference to FIG. 2 and FIG. 3.

The extraction unit 31 extracts a three-dimensional object having a tree structure from volume data. Examples of a three-dimensional object having a tree structure are blood vessels and bronchi. In embodiments of the present disclosure, bronchi are used as an example of the three-dimensional object, and a case of extracting the bronchi from volume data obtained by imaging at a CT apparatus will be described.

First, the image processing workstation 3 retrieves, from the image storage server 2, volume data V of a patient for whom a three-dimensional model should be produced, and receives volume data V. The image processing workstation 3 extracts the structure of the bronchi of the patient from received volume data V by using the extraction unit 31 (#1).

The bronchi in volume data V appear as a region having low CT values (voxel values) in a CT image, because voxels within the bronchi correspond to an air region. However, the bronchial wall is considered as a linear structure having relatively high CT values. Therefore, a set of voxels having image values that have likelihood of the bronchi is extracted as a bronchial region by using a region expansion method. Further, thinning is performed on the extracted bronchial region, and an obtained linear structure representing the bronchi is extracted.

Alternatively, the bronchi are extracted by performing, based on the distribution of CT values, structure analysis of morphology on each voxel. The bronchi branch at many stages, and the diameter of the bronchi becomes narrower toward their terminal ends. Therefore, Gaussian pyramid images (in other words, plural three-dimensional images having different resolutions) are generated, in advance, by performing multiple resolution transformation on volume data to make the bronchi (a linear structure) in various sizes detectable. A linear structure in various sizes is detected by scanning a detection algorithm for each image of the generated Gaussian pyramid.

The linear structure extracted in this manner is not always detected as a tree structure in which all linear structures are connected to each other. Therefore, the connection relationship of the detected linear structures is reconstructed. Extraction of the tree structure of the bronchi is completed by this reconstruction. The extracted linear structure is classified into end points, branch points and edges. Tree structure data representing the bronchi are obtained by connecting the end points and the branch points of the tree structure by the edges. Further, feature values, such as the diameter of the bronchi at each position of the tree structure and the length of each edge (a length between branch points of the bronchi), are also stored as tree structure data, if necessary.

Regarding a method for extracting a tree structure, a different method may be used. Alternatively, the tree structure may be extracted by using the method in combination with the other method. Methods for extracting a tree structure disclosed in Japanese Unexamined Patent Publication No. 2010-220742, Japanese Unexamined Patent publication No. 2011-212312, Japanese Unexamined Patent Publication No. 2012-200403, Japanese Unexamined Patent Publication No. 2012-228396, which were filed by the applicant of the present application, and the like may be used.

A tree structure includes plural end points, plural branch points, at least one edge connecting an end point and a branch point to each other and at least one edge connecting two branch points to each other. FIG. 4 is a diagram illustrating an example of a tree structure when the bronchi have been extracted. In the left section of the diagram of FIG. 4, edges are represented by lines. Further, intersections of edges (white circle ○) represent branch points (In the left section of FIG. 4, an intersection without white circle ○ represents a state in which edges cross each other but they are three-dimensionally apart from each other. Therefore, they are not branch points. Hereafter, the same tree structure will be used also in explanation using FIGS. 5 through 7, FIG. 10 and FIGS. 11A through 11C.)

Next, a first end point determination unit 32 determines one of plural end points of a tree structure, as a first end point (#2). When an object has a structure, such as the structure of bronchi, it is desirable that an end point regarded as a root, which corresponds to an entrance position of the bronchi, is determined as the first end point. Specifically, the root may be determined by user's selection of an end point corresponding to the entrance of the bronchi from plural end points of an extracted tree structure. Alternatively, an end point at the entrance position of the bronchi may be determined as the root by performing feature (for example, the size of a diameter, characteristics of a form or the like) analysis on a three-dimensional object. The right section of the diagram of FIG. 4 illustrates a state in which end point Root of a root (black circle •) has been determined.

A division position search unit 33 searches a path advancing from one of plural end points of a tree structure other than the root toward the root for a division position on an edge at which the size of a downstream tree structure spreading therefrom in a direction opposite to a direction in which the path advances toward the root becomes a size exceeding an output range of a three-dimensional printer 4. In the following descriptions, the term "upstream" represents a part of the tree structure extending from a branch point toward the root (first end point), and the term "downstream" represents a part of the tree structure extending from a branch point in a direction opposite to the root.

Figure 5:
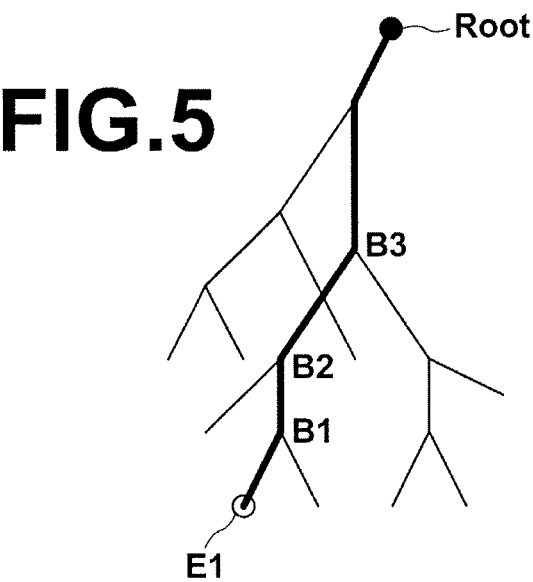
FIG. 5 is a diagram for explaining selection of an end point other than a root from plural end points of a tree structure.

First, as illustrated in FIG. 5, end point (second end point) E1, other than the root, is selected from plural end points of the tree structure (#3). A path from root Root to end point E1 is uniquely determined as indicated by a bold line in FIG. 5. This path is followed backward from end point E1 to root Root, and a position at which a division object exceeds the output range of the three-dimensional printer 4 is searched for (#4). It is desirable to select, as second end point E1, an end point having a longest total length of edges on the path to the root therefrom from end points included in the three-dimensional object other than the root.

Figure 6A:
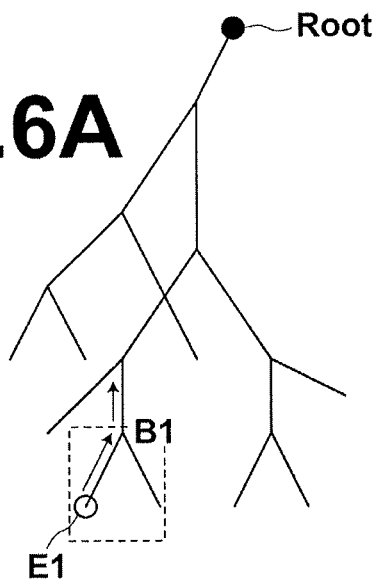
FIG. 6A is a diagram for explaining a method for selecting a selected region by following a path from a second end point (No. 1)
Figure 6B:
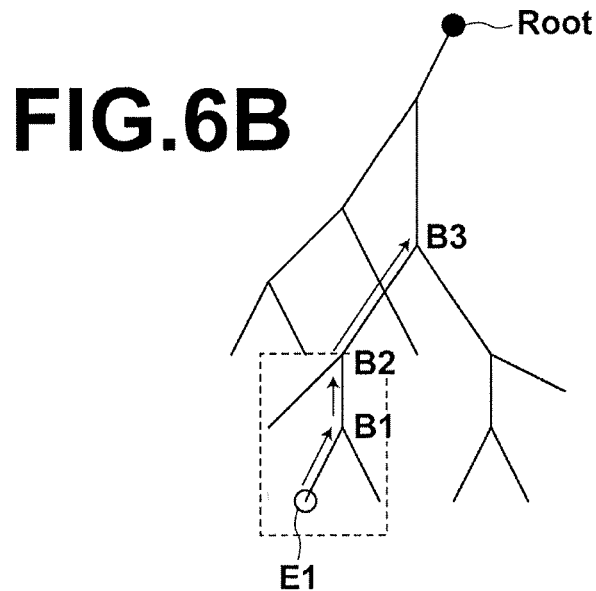
FIG. 6B is a diagram for explaining the method for selecting a selected region by following the path from the second end point (No. 2)
Figure 6C:
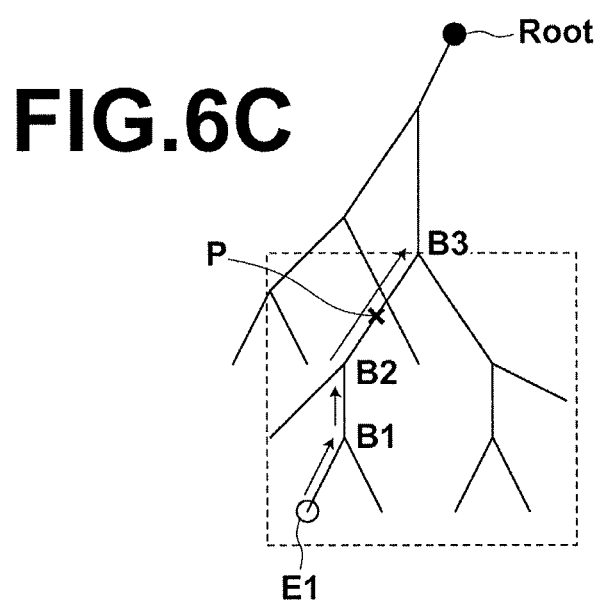
FIG. 6C is a diagram for explaining the method for selecting a selected region by following the path from the second end point (No. 3)

When search reaches first branch point B1 by following the path from second end point E1, two edges located in the downstream direction of branch B1 are added to a selected region (indicated by a frame in FIG. 6A). If the selected region does not exceed the output range of the three-dimensional printer 4, search advances to branch point B2. Similarly, all the tree structures located in the downstream direction of branch point B2 are added to the selected region also at branch point B2 (indicated by a frame in FIG. 6B). If the selected region does not exceed the output range of the three-dimensional printer 4, search further advances to branch point B3, and all the tree structures located in the downstream direction of branch point B3 are added to the selected region (indicated by a frame in FIG. 6C). If the selected region exceeds the output range of the three-dimensional printer 4 at branch point B3, point P at which the selected region exceeds the output range of the three-dimensional printer 4 is set on an edge reaching branch point B3 from branch point B2, and point P is determined as a division position.

Judgment as to whether a selected region exceeds the output range of the three-dimensional printer 4 or not may be made by judging whether all of the height, width and depth of the selected region are less than or equal to the maximum height, width and depth of the output range of the three-dimensional printer 4. In other words, point P at which the height, width and depth of a tree structure located in the downstream direction of point P are less than or equal to the maximum height, width and depth of the output range of the three-dimensional printer 4 is a division position.

Specifically, a convex hull formed by envelope surfaces is obtained by applying an algorithm for calculating a convex hull to end points of a tree structure included in a division object obtainable by dividing the tree structure at a point on an edge. Further, judgment is made as to whether this convex hull is within the output range of the three-dimensional printer 4. The output range of the three-dimensional printer 4 is defined by a rectangular parallelepiped. Therefore, it is possible to judge whether the convex hull is within the output range of the three-dimensional printer 4 by obtaining a circumscribed rectangular parallelepiped that is circumscribed around the convex hull enclosing the division object, and by comparing three edges (height, width and depth) of the circumscribed rectangular parallelepiped with those of the rectangular parallelepiped of the output range of the three-dimensional printer 4. Judgment is made as to whether the circumscribed rectangular parallelepiped is maximized with respect to the output range to minimize the number of times of division of the three-dimensional object. Specifically, a circumscribed rectangular parallelepiped having a height, a width and a depth all of which are less than or equal to those of the maximum output range of the three-dimensional printer 4, and at least one of which is the size of the maximum output range, should be found.

Although it is possible to find many rectangular parallelepipeds that are circumscribed around the convex hull, judgment is made as to whether a smallest rectangular parallelepiped having a smallest volume among the circumscribed rectangular parallelepipeds is within the output range of the three-dimensional printer 4. Accordingly, it is possible to divide the three-dimensional object into a smaller number of parts, and to efficiently output the whole three-dimensional object to the three-dimensional printer 4 in a small number of times of output.

Alternatively, judgment as to whether the output range of the three-dimensional printer 4 is exceeded or not may be made by judging whether the height, width and depth when the tree structure is inclined are within the output range of the three-dimensional printer 4. A division position to which the path is followed backward as far as possible from end point E1 is searched for. When the division position to which the path is followed backward as far as possible from end point E1 is searched for in this manner, it is possible to reduce the number of times of division of the three-dimensional object.

Further, the division position search unit 33 searches for a position at which the size of a division object becomes a size within the output range, and also if the diameter of a cut surface of the three-dimensional object divided at the division position is less than a predetermined value, a position at which the diameter of a cut surface is greater than the predetermined value on the same edge, and determines the position as the division position. When an object, such as the bronchi, is divided, it is desirable to divide the bronchi at a position that is as thick as possible, in other words, having as a large diameter as possible to join division objects together later. When an end point of an edge located at a position corresponding to the airway of the bronchi is regarded as a root, the probability that point P at which the size of the division object becomes a size within the output range of the three-dimensional printer 4 while a path is followed backward from a terminal end of the bronchi, as described above, is directly determined as the division position is high, because the bronchi normally become thicker (in other words, the diameter of the bronchi increases) as the position is closer to the root. When the three-dimensional object having a tree structure is blood vessels, the diameter of the blood vessel at the division position is small in some cases, depending on the manner of selecting an end point as a root. Therefore, if the diameter is less than a predetermined value, it is desirable to determine, as a division position, a position having a diameter greater than a predetermined value on the edge on which the division position is present or a position having the largest diameter on the edge on which the division position is present. In the example illustrated in FIG. 6C, a portion of the edge between branch point B2 and point P is searched for a division position.

The division unit 34 divides the three-dimensional object into two at the division position. The division unit 34 divides the three-dimensional object into an object having a size within the output range, as a division object, and a remaining object (#5).

The output unit 35 outputs the generated division object to the three-dimensional printer 4 (#6). Specifically, the output unit 35 generates cross-sectional data by dividing the division object at contour surfaces, and outputs the cross-sectional data to the three-dimensional printer 4. If the division object in this state is not within the output range of the three-dimensional printer 4, the output unit 35 generates cross-sectional data by dividing the division object at contour surfaces in a state in which the division object is inclined so that the division object is within the output range.

After the division object is output, if the remaining three-dimensional object excluding the output division object exceeds the output range of the three-dimensional printer, division is performed again (#7-NO).

Then, the repetition control unit 36 makes processing return to step #3, and the division position search unit 33 searches for a division position again. First, the division position search unit 33 selects an end point from end points included in the three-dimensional object excluding the division object other than the root, and determines the selected end point, as second end point E1 (#3). It is desirable to select, as second end point E1, an end point having a longest total length of edges on a path to the root therefrom from the end points included in the three-dimensional object excluding the division object.

A division position is searched for by following backward a path between this second end point E1 and root Root (#4), and a division object is generated by dividing the three-dimensional object (#5), and the division object is output to the three-dimensional printer 4 (#6). These kinds of processing are repeated until the remaining three-dimensional object, which excludes the output division object, becomes a size within the output range of the three-dimensional printer 4. When the remaining three-dimensional object, excluding the output division objects, becomes a size within the output range of the three-dimensional printer 4 (#7—YES), the remaining three-dimensional object is output to the three-dimensional printer 4, and processing ends (#8).

Figure 7:
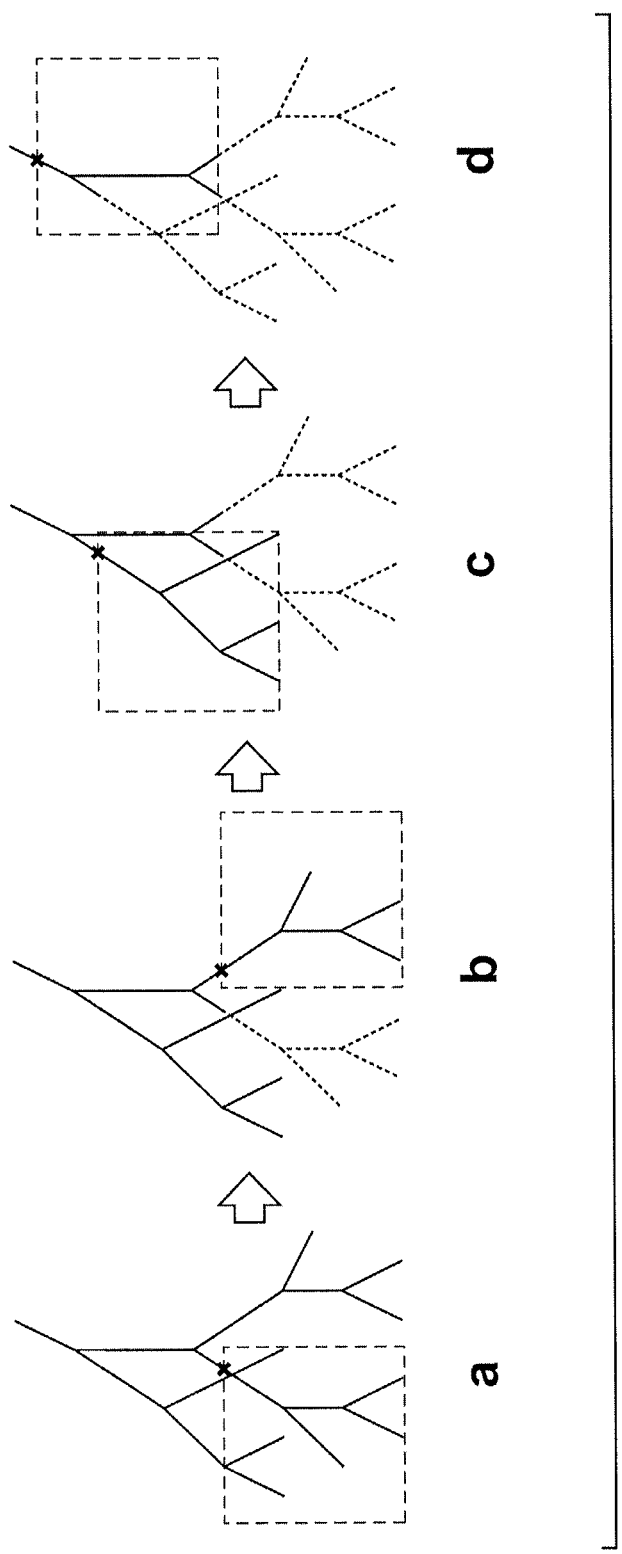
FIG. 7 is a diagram illustrating processes of dividing a tree structure.

FIG. 7 illustrates a manner of dividing the tree structure. In FIG. 7, a division object is generated by searching the tree structure for a division position from a lower left end point of the tree structure (a frame part in section a, which is the leftmost section in FIG. 7). Next, a division object is generated by searching the tree structure for a division position from a lower right end point of the tree structure (a frame part in section b, which is the second section from the left in FIG. 7). Further, a division object is generated by searching the tree structure for a division position from a lower left end point of a remaining tree structure (a frame part in section c, which is the third section from the left in FIG. 7). Finally, a division object is generated by searching the tree structure for a division position from a lower right end point of a remaining tree structure (a frame part in section d, which is the rightmost section in FIG. 7).

In the above descriptions, a case in which when the division position search unit 33 follows the path backward from the second end point to the root, the division position search unit 33 searches, in order of reaching each branch point on the path from the second end point toward the root, for a branch point at which the size of a downstream tree structure spreading therefrom becomes a size within the output range has been described. Alternatively, the division position search unit 33 may search all edges on the path from the end point to the root, in any order, for an edge connecting two branch points to each other, and the size of a downstream tree structure spreading from one of the two branch points being within the output range while the size of a downstream tree structure spreading from the other one of the two branch points exceeds the output range. Further, the division position search unit 33 may search the edge for the division position. Alternatively, the division position search unit 33 may search, in order of reaching each branch point when search is performed from the root toward the second end point, for a branch point at which the size of a downstream tree structure spreading therefrom becomes a size within the output range.

In the above descriptions, a case in which the first end point is a root was described. However, the first end point is not necessarily the root. A specific end point of the tree structure should be selected as the first end point.

Next, a three-dimensional object division output unit according to a second embodiment of the present disclosure will be described. In the second embodiment, instead of searching for a division position of a three-dimensional object on a path toward a specific end point, such as a root, a case in which a division position is searched for while a path on which search advances is determined at each branch point will be described. The configuration of a three-dimensional model production system is the same as that of the first embodiment.

Figure 8:
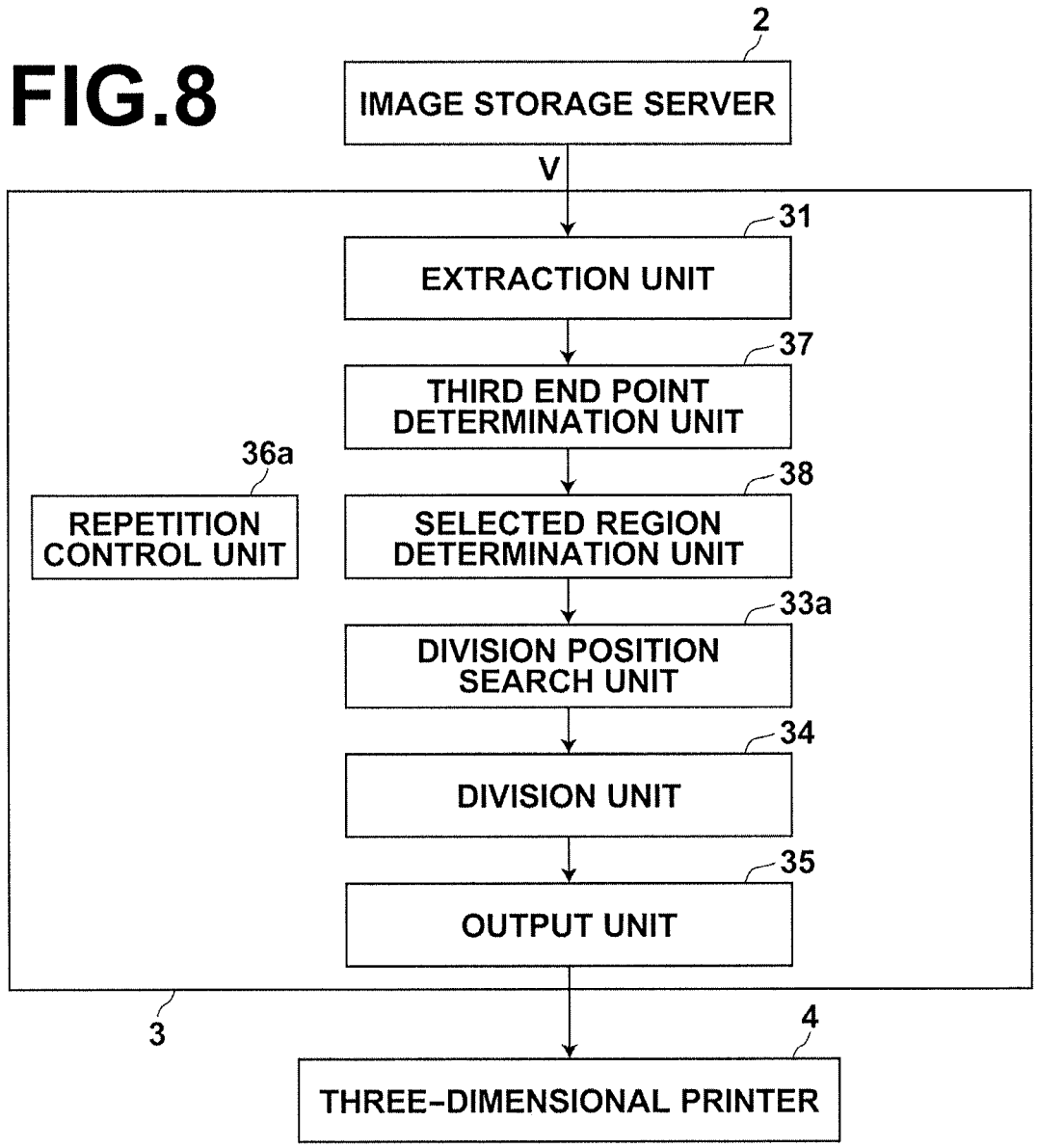
FIG. 8 is a functional block diagram of a three-dimensional object division output unit according to a second embodiment of the present disclosure.
Figure 9:
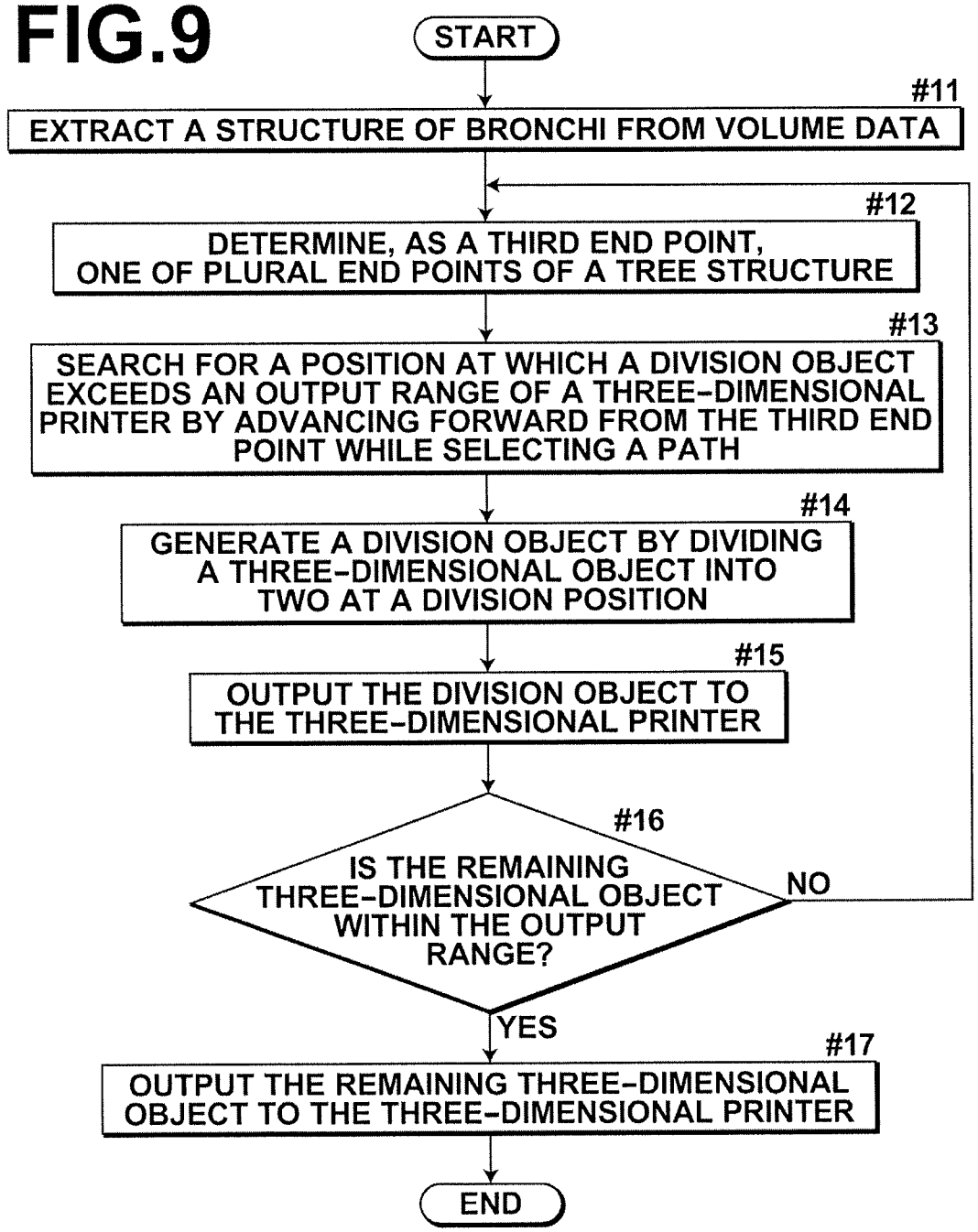
FIG. 9 is a flow chart showing a flow of processing of a three-dimensional model production system according to the second embodiment of the present disclosure.

FIG. 8 is a block diagram illustrating a three-dimensional object division output unit, which is the second embodiment of the present disclosure, as one of functions of the image processing workstation 3. FIG. 9 is a flow chart showing a flow of processing. As illustrated in FIG. 8, the three-dimensional object division output unit in the second embodiment of the present disclosure is achieved by the extraction unit 31, a third end point selection unit 37, a selected region determination unit 38, a division position search unit 33a, the division unit 34, the output unit 35 and a repetition control unit 36a. The extraction unit 31 is the same as that of the first embodiment. Therefore, detailed descriptions will be omitted.

Next, with reference to FIG. 8 and FIG. 9, the three-dimensional object division output unit of the second embodiment will be described in detail.

First, the image processing workstation 3 retrieves, from the image storage server 2, volume data V of a patient for whom a three-dimensional model should be produced. The image processing workstation 3 extracts the structure of the bronchi of the patient from received volume data V by using the extraction unit 31 (#11).

Figure 10:
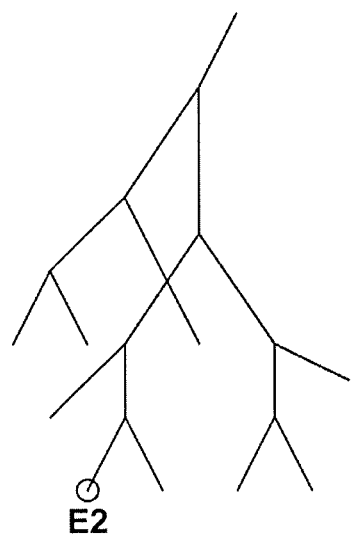
FIG. 10 is a diagram for explaining selection of a third end point.

Next, as illustrated in FIG. 10, the third end point selection unit 37 selects, as third end point E2, one of plural end points of the three dimensional object (#12).

The selected region determination unit 38 starts processing from third end point E2, and advances while selecting, at each reached branch point, an edge having a largest number of edges continuing forward therefrom from edges to which the branch point branches, as a path, and searches for a position at which a division object exceeds the output range of the three-dimensional printer 4 (#13). In the descriptions of the second embodiment, the term "upstream" represents a part of the tree structure extending from a branch point in an advancing direction of the path, and the term "downstream" represents a part of the tree structure extending from a branch point in a direction opposite to the advancing direction of the path.

Figure 11A:
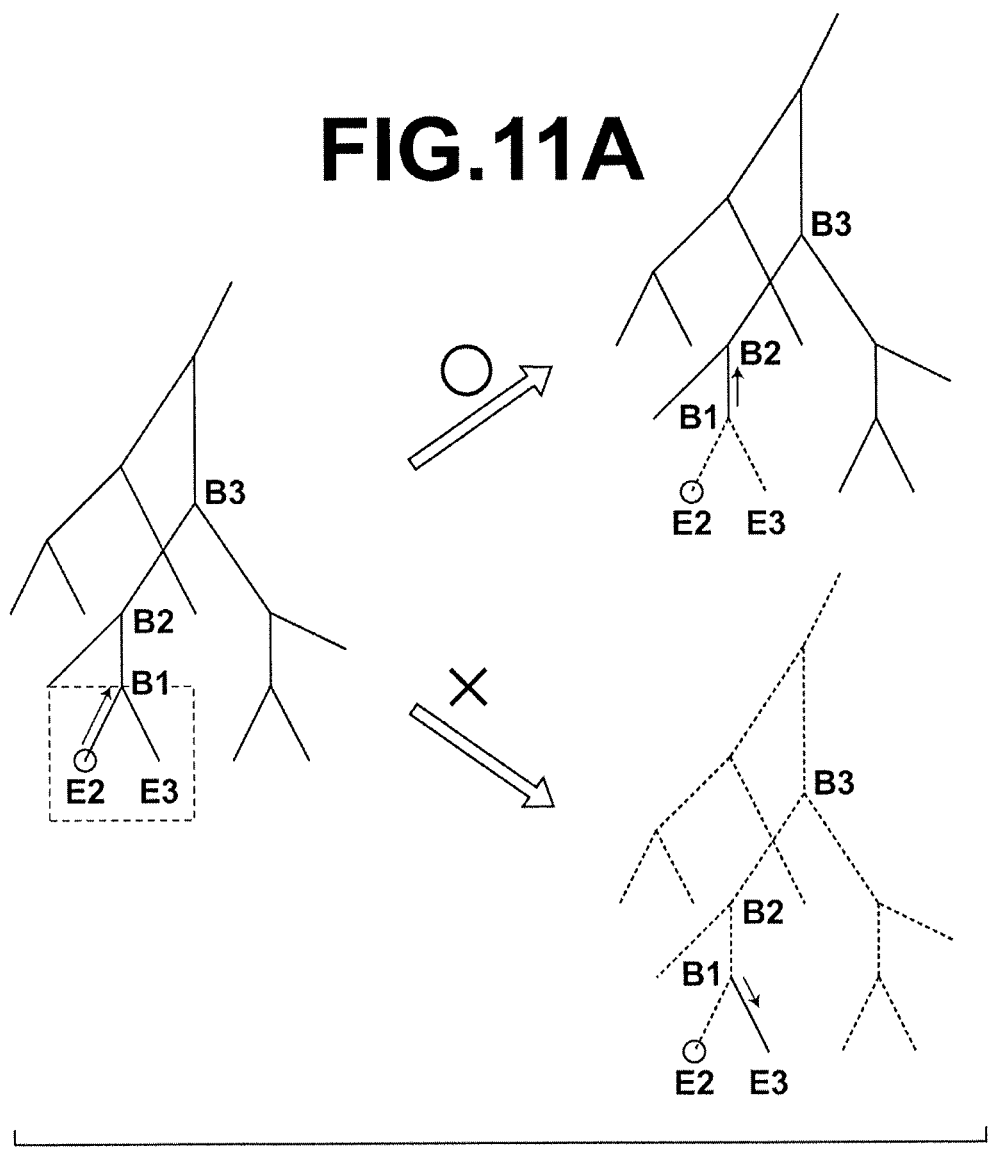
FIG. 11A is a diagram for explaining a method for selecting a path in the second embodiment of the present disclosure (No. 1)

First, as illustrated in FIG. 11A, the selected region determination unit 38 selects, at branch point B1, which is the first reached branch point, an edge between branch point B1 and branch point B2, as the path. The selected region determination unit 38 selects the edge from two edges branching from branch point B1, namely, an edge between branch point B1 and end point E3 and the edge between branch point B1 and branch point B2, because the number of edges continuing forward from the edge between branch point B1 and branch point B2 (16 edges) is larger than the number of edges continuing forward from the edge between branch point B1 and end point E3 (an upper right section in the diagram of FIG. 11A). Meanwhile, the selected region determination unit 38 does not select the edge between branch point B1 and end point E3, as the path, because there is only one edge (a lower right section in the diagram of FIG. 11A). Further, edges located on the downstream side of branch point B1 are included in the selected region (indicated by a frame in a left section in the diagram of FIG. 11A).

The division position search unit 33a searches each branch point on the path for a branch point at which the size of the tree structure included in the selected region becomes a size exceeding the output range of the three-dimensional printer 4 from a size within the output range of the three-dimensional printer 4. Judgement as to whether the size of the selected region exceeds the output range of the three-dimensional printer 4 or not may be made in a similar manner to the first embodiment by judging whether all of the height, width and depth of the selected region are less than or equal to the maximum height, width and depth of the output range of the three-dimensional printer 4. Therefore, judgment is made as to whether the selected region on the downstream side of branch point B1 exceeds the output range of the three-dimensional printer 4. If the selected region does not exceed the output range, search advances to next branch point B2.

Figure 11B:
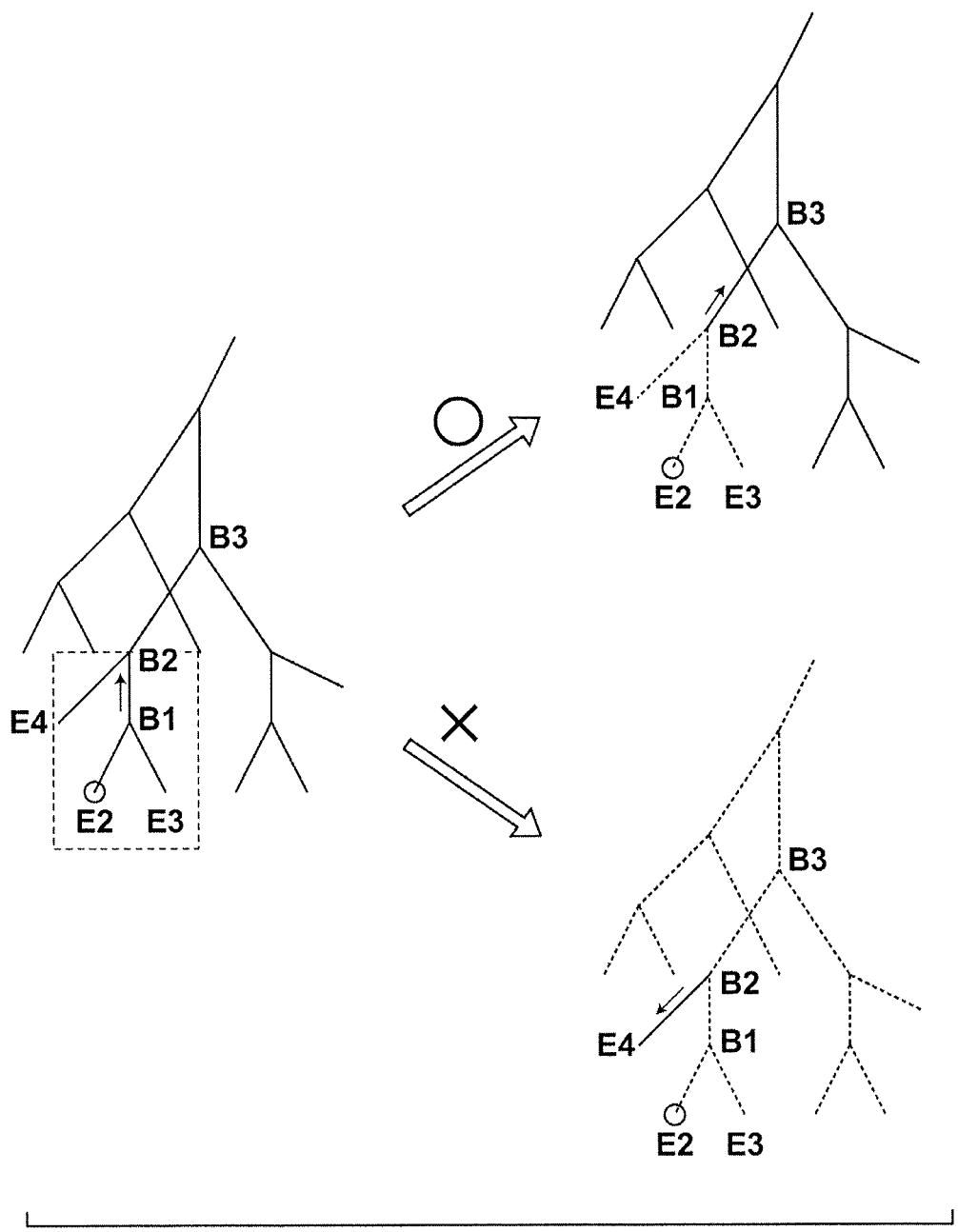
FIG. 11B is a diagram for explaining the method for selecting the path in the second embodiment of the present disclosure (No. 2)

Next, as illustrated in FIG. 11B, the selected region determination unit 38 selects an edge between branch point B2 and branch point B3, as the path, from two edges branching from branch point B2, namely, an edge between branch point B2 and end point E4 and the edge between branch point B2 and branch point B3, because the number of edges continuing forward from the edge between branch point B2 and branch point B3 (13 edges) is larger than the number of edges continuing forward from the edge between branch point B2 and end point E4 (an upper right section in the diagram of FIG. 11B). Meanwhile, the selected region determination unit 38 does not select the edge between branch point B2 and end point E4, as the path, because there is only one edge (a lower right section in the diagram of FIG. 11B). Further, edges located on the downstream side of branch point B2 are included in the selected region (indicated by a frame in a left section in the diagram of FIG. 11B).

The division position search unit 33a judges whether the selected region on the downstream side of branch point B2 exceeds the size of the output range of the three-dimensional printer 4. If the selected region does not exceed the size of the output range, processing advances to next branch point B3.

Figure 11C:
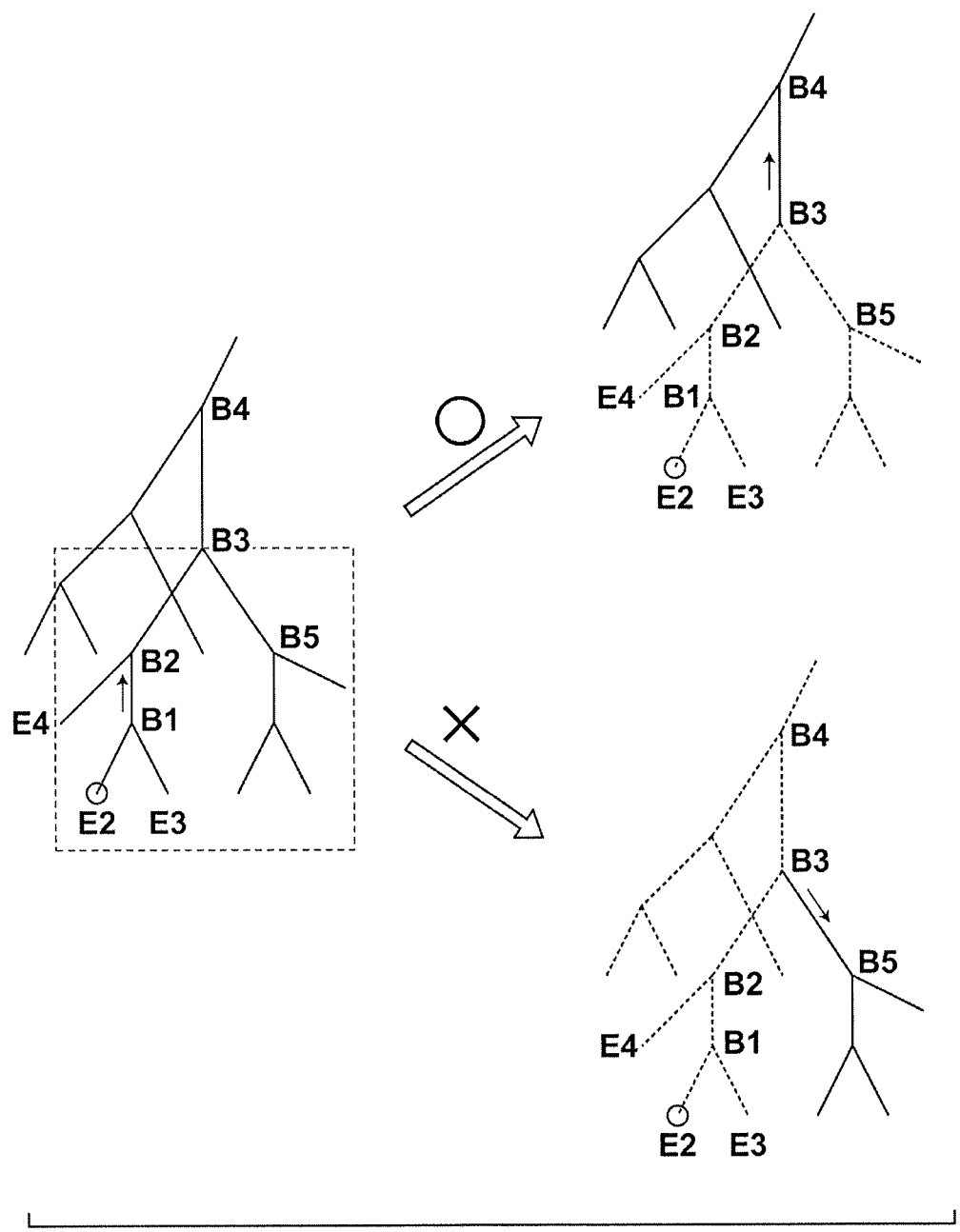
FIG. 11C is a diagram for explaining the method for selecting the path in the second embodiment of the present disclosure (No. 3).

Further, as illustrated in FIG. 11C, the selected region determination unit 38 selects an edge between branch point B3 and branch point B4, as the path, from two edges branching from branch point B3, namely, an edge between branch point B3 and branch point B4 and an edge between branch point B3 and branch point B5, because the number of edges continuing forward from the edge between branch point B3 and branch point B4, which is 7 (an upper right section in the diagram of FIG. 11C), is larger than the number of edges continuing forward from the edge between branch point B3 and branch point B5, which is 5 (a lower right section in the diagram of FIG. 11C). Meanwhile, the selected region determination unit 38 does not select the edge between branch point B3 and branch point B5, as the path, because there are a smaller number of edges continuing forward. Further, a part of the tree structure located on the downstream side of branch point B3 is included in the selected region (indicated by a frame in a left section in the diagram of FIG. 11C).

Processing advances on the path as described above. If the size of a division object exceeds the size of the output range at branch point B4, the edge between branch point B3 and branch point B4, which is immediately before branch point B4, is searched for a division position at which the size of a division object becomes a size within the size of the output range. In a manner similar to the first embodiment, point P at which the height, width and depth of a division object become less than or equal to the maximum height, width and depth of the output range of the three-dimensional printer 4 is searched for.

Next, in a manner similar to the first embodiment, the division unit 34 divides the three-dimensional object into two at the division position. The division unit 34 divides the three-dimensional object into an object having a size within the output range, as a division object, and a remaining object (#14). The output unit 35 outputs the generated division object to the three-dimensional printer 4 (#15).

After the division object is output, if the remaining three-dimensional object, which excludes the output division object, exceeds the output range of the three-dimensional printer 4, division is performed again (#16—NO).

Then, the repetition control unit 36a makes processing return to step #12. The third end point selection unit 37 selects other third end point E2 again (#12), and the division position search unit 33a searches for a division position. A division position is searched for by following a path backward from this third end point E2, as described above (#13), and a division object is generated by dividing the three-dimensional object (#14), and the division object is output to the three-dimensional printer 4 (#15). These kinds of processing are repeated until the remaining three-dimensional object, which excludes the output division object, becomes a size within the output range of the three-dimensional printer 4. When the remaining three-dimensional object, which excludes the output division objects, becomes a size within the output range of the three-dimensional printer 4 (416—YES), the remaining three-dimensional object is output to the three-dimensional printer 4, and processing ends (#17).

In the output unit 35 of the first and second embodiments, a case of outputting a division object obtained by simply dividing the three-dimensional object has been described. However, it is desirable that the division object is output to the three-dimensional printer 4 after providing a connecting portion on each of two cut surfaces of the divided objects. The connecting portions have shapes that make the division objects fittable together at the cut surfaces The shape of a cut surface obtained by dividing the bronchi or blood vessels at an edge (a branch) is close to a circle. If a connecting portion in circular shape is provided, as the connecting portion, when the division objects are connected to each other, an edge is rotated in some cases, and connected in a direction different from a direction in which the edge should be originally connected. Therefore, it is desirable that the shape of the connecting portion is a scalene triangle, a trapezoid or the like, which uniquely specifies a direction of fitting the connecting portion. Further, when the three-dimensional object is divided at plural positions into division objects, it is desirable that the shapes or sizes of connecting portions of the division objects differ at the plural positions to prevent erroneous connection of the connecting portions.

The present disclosure is not limited to embodiments of the present disclosure. A part or all of the steps of the three-dimensional object division output unit may be performed by a computer, or by a system configured by at least one computer, a server and a storage device connected to each other through a network. Here, each equipment is controlled by a program of the three-dimensional object division output unit described in the specification of the present application, and which is installed from a recording medium, such as a CD-ROM. Further, the program may be installed after being downloaded from a storage device of a server connected to the computer through a network, such as the Internet.

What is claimed is:

1. A three-dimensional object division output apparatus comprising:
    a memory storing computer-readable instructions; and
    a processor configured to execute the computer-readable instructions, which when executed cause the processor to control the three-dimensional object division output apparatus to implement:
        an extraction unit that extracts, from image data of a three-dimensional medical image, a three-dimensional object having a tree structure including a plurality of end points, a plurality of branch points, first edges each connecting one of the plurality of end points and one of the plurality of branch points to each other, and second edges each connecting two of the plurality of branch points to each other;
        a first end point determination unit that determines one of the plurality of end points, as a first end point;
        a division position search unit that searches for a division position on one of the edges among the first edges and the second edges present on a path from a second end point, which is one of the plurality of end points other than the first end point, toward the first end point, wherein the division position is a turning point where a size of a downstream tree structure changes from a size within an output range of a three-dimensional object creation apparatus to a size exceeding the output range, and wherein the downstream tree structure spreads from the division position toward a direction opposite to the first end point;
        a division unit that divides, at the division position obtained by search, the three-dimensional object into a division object, the size of which is within the output range and a remaining object; and
        an output unit that outputs the division object to the three-dimensional object creation apparatus, wherein the three-dimensional object creation apparatus creates a physical object that corresponds to the division object.

2. The three-dimensional object division output apparatus, as defined in claim 1, wherein when the division position search unit performs search from the second end point toward the first end point on the path, the division position search unit searches, in order of reaching each branch point on the path, for a branch point at which the size of a downstream tree structure spreading therefrom toward a direction opposite to the first end point changes from a size within the output range to a size exceeding the output range, and searches an edge immediately before the branch point, obtained by search, for the division position at which the size of the division object becomes a size within the output range.

3. The three-dimensional object division output apparatus, as defined in claim 1, wherein the division position search unit searches each edge on the path for an edge connecting two branch points to each other and the size of a downstream tree structure spreading from one of the two branch points toward a direction opposite to the first end point being within the output range while the size of a downstream tree structure spreading from the other one of the two branch points toward a direction opposite to the first end point exceeds the output range, and searches the edge, obtained by the search, for the division position at which the size of the division object becomes a size within the output range.

4. The three-dimensional object division output apparatus, as defined in claim 1, wherein the processor, when executing the computer-readable instructions, is further configured to control the three-dimensional object division output apparatus to implement:
 a repetition control unit that repeatedly generates, with respect to the three-dimensional object excluding the division object, a new division object by using the division position search unit and the division unit.

5. The three-dimensional object division output apparatus, as defined in claim 4, wherein the division position search unit selects, as the second end point, an end point having a longest total length of edges on a path to the first end point therefrom from end points included in the three-dimensional object or the three-dimensional object excluding the division object other than the first end point.

6. The three-dimensional object division output apparatus, as defined in claim 1, wherein the first end point is a specific end point.

7. A three-dimensional object division output apparatus comprising:
 a memory storing computer-readable instructions; and
 a processor configured to execute the computer-readable instructions, which when executed cause the processor to control the three-dimensional object division output apparatus to implement:
  an extraction unit that extracts, from image data of a three-dimensional medical image, a three-dimensional object having a tree structure including a plurality of end points, a plurality of branch points, first edges each connecting one of the plurality of end points and one of the plurality of branch points to each other, and second edges each connecting two of the plurality of branch points to each other;
  a third end point selection unit that selects one of the plurality of end points, as a third end point;
  a selected region determination unit that determines a selected region by advancing on a path from the third end point toward another end point of the tree structure while selecting, at each of the branch points reached from the third end point, an edge having a largest number of edges continuing forward therefrom from the edges to which the each of the branch points branches, and by repeating processing of including, in the selected region, a downstream tree structure spreading from the each of the branch points toward a direction opposite to a direction in which processing advances on the path;
  a division position search unit that searches each of the branch points on the path for a branch point at which the size of the tree structure included in the selected region becomes a size exceeding the output range of the three-dimensional object creation apparatus from a size within the output range, and searches an edge immediately before the branch point, obtained by search, for a division position, wherein the division position is a turning point where a size of a division object changes from a size exceeding the output range to a size within the output range;
  a division unit that divides, at the division position, the three-dimensional object into the division object the size of which is within the output range and a remaining object; and
  an output unit that outputs the division object to the three-dimensional object creation apparatus, wherein the three-dimensional object creation apparatus creates a physical object that corresponds to the division object.

8. The three-dimensional object division output apparatus, as defined in claim 7, wherein the processor, when executing the computer-readable instructions, is further configured to control the three-dimensional object division output apparatus to implement:
 a repetition control unit that repeatedly generates, with respect to the three-dimensional object excluding the division object, a new division object by using the third end point selection unit, the selected region determination unit, the division position search unit and the division unit.

9. The three-dimensional object division output apparatus, as defined in claim 1, wherein the division position search unit searches for a division position at which the size of the division object becomes a size within the output range, and also if the diameter of a cut surface of the three-dimensional object divided at the division position is less than a predetermined value, a division position at which the diameter of a cut surface is greater than the predetermined value on the same.

10. The three-dimensional object division output apparatus, as defined in claim 7, wherein the division position search unit searches for a division position at which the size of the division object becomes a size within the output range, and also if the diameter of a cut surface of the three-dimensional object divided at the division position is less than a predetermined value, a division position at which the diameter of a cut surface is greater than the predetermined value on the same edge.

11. An operation method of a three-dimensional object division output apparatus including a memory storing computer-readable instructions and a processor configured to execute the computer-readable instructions, which when executed cause the processor to control the three-dimensional object division output apparatus to implement an extraction unit, a first end point determination unit, a division position search unit, a division unit and an output unit, the method comprising:
 an extraction step in which the extraction unit extracts, from image data of a three-dimensional medical image, a three-dimensional object having a tree structure including a plurality of end points, a plurality of branch points, first edges each connecting one of the plurality of end points and one of the plurality of branch points to each other, and second edges each connecting two of the plurality of branch points to each other;
 a first end point determination step in which the first end point determination unit determines one of the plurality of end points, as a first end point;
 a division position search step in which the division position search unit searches for a division position on one of the edges among the first edges and the second edges present on a path from a second end point, which is one of the plurality of end points other than the first end point, toward the first end point, wherein the division position is a turning point where a size of a downstream tree structure changes from a size within an output range of a three-dimensional object creation apparatus to a size exceeding the output range, and wherein the downstream tree structure spreads from the division position toward a direction opposite to the first end point;

a division step in which the division unit divides, at the division position obtained by search, the three-dimensional object into a division object, the size of which is within the output range and a remaining object; and an output step in which the output unit outputs the division object to the three-dimensional object creation apparatus, wherein the three-dimensional object creation apparatus creates a physical object that corresponds to the division object.

12. A non-transitory computer-readable recording medium storing therein a three-dimensional object division output program, which when executed causes a processor of a three-dimensional object division output apparatus to execute an operation method of the three-dimensional object division output apparatus, the operation method comprising:

an extraction step that extracts, from image data of a three-dimensional medical image, a three-dimensional object having a tree structure including a plurality of end points, a plurality of branch points, first edges each connecting one of the plurality of end points and one of the plurality of branch points to each other, and second edges each connecting two of the plurality of branch points to each other;

a first end point determination step that determines one of the plurality of end points, as a first end point;

a division position search step that searches for a division position on one of the edges among the first edges and the second edges present on a path from a second end point, which is one of the plurality of end points other than the first end point, toward the first end point, wherein the division position is a turning point where a size of a downstream tree structure changes from a size within an output range of a three-dimensional object creation apparatus to a size exceeding the output range, and wherein the downstream tree structure spreads from the division position toward a direction opposite to the first end point;

a division step that divides, at the division position obtained by search, the three-dimensional object into a division object, the size of which is within the output range and a remaining object; and an output step that outputs the division object to the three-dimensional object creation apparatus, wherein the three-dimensional object creation apparatus creates a physical object that corresponds to the division object.

13. The three-dimensional object division output apparatus, as defined in claim 1, wherein the three-dimensional object having a tree structure comprises blood vessels or bronchi.

* * * * *